# 3,787,442
TETRAHYDRO-2H-THIOPYRAN-4-SULFAMIC ACIDS AND SALTS

Gerhard R. Wendt, Havertown, and Michael W. Winkley, Malvern, Pa., assignors to American Home Products Corporation, New York, N.Y.
No Drawing. Filed Jan. 26, 1973, Ser. No. 326,703
Int. Cl. C07d 65/04
U.S. Cl. 260—327 TH      8 Claims

ABSTRACT OF THE DISCLOSURE

Compounds of the formula:

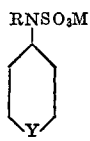

in which

R is hydrogen, lower alkyl or hydroxy(lower)alkyl;
M is hydrogen, an alkali metal or an alkaline earth metal; and
Y is

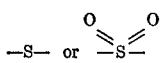

are non-nutritive artificial sweeteners.

BRIEF DESCRIPTION OF THE INVENTION

In accordance with this invention there is provided a group of non-nutritive artificial sweetening agents useful in the formulation of medicament coatings, confections, animal feeds, and the like, where the masking of undesirable flavors or the introduction of the sweetness flavor sense is otherwise desirable. The compounds of this invention which exhibit a pleasant, very sweet taste are 4-sulfamic acids and salts of thiopyran and the corresponding sulfone and present the structural formula:

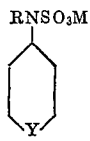

in which

R is a member selected from the group consisting of —H, lower alkyl and hydroxy(lower)alkyl radicals;
M is a member selected from the group consisting of —H, an alkali metal and an alkaline earth metal; and
Y is a member selected from the group consisting of

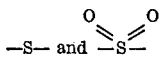

The expression "lower alkyl" is employed herein to denote univalent aliphatic hydrocarbon radicals of from 1 to about 7 carbon atoms. The expression hydroxy (lower)alkyl is employed herein to denote omega-hydroxy lower alkyl groups. By alkali metal and alkaline earth metal, applicants intend to embrace the elements lithium, sodium, potassium, magnesium and calcium.

The artificial sweeteners of this invention may be used in aqueous media or in solid form, the latter being amenable to dry formulations common in animal feeds.

The artificial sweeteners of this invention are about as sweet as calcium or sodium cyclamate and are utilized in amounts relative to that degree of sweetness.

The compounds may be prepared by various processes such as by sulfonation of tetrahydro-2H-thiopyran-4-amine (Barkenbus et al., JACS, 77, 3866 (1955)) or by reductive amination of tetrahydro-2H-thiopyran-4-one or its sulfone with a lower alkyl substituted amine followed by sulfonation. The resulting sulfamic acids may be advantageously purified and characterized in the form of their hdyrochloride salt. Conversion to the alkali metal or alkaline earth metal salt is accomplished by neutralization of the sulfamic acid with the desired metal base. The tetrahydro-2H-thiopyran sulfamic acids may be converted to the corresponding sulfone by oxidation with a suitable oxidant such as hydrogen peroxide, or the sulfone may be employed as the initial reactant in reductive amination of the thiopyran-4-one.

EXAMPLE I

Tetrahydro-2H-thiopyran-4-sulfamic acid

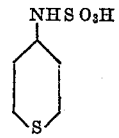

To a solution of 12.7 g. of tetrahydro-2H-thiopyran-4-amine in 50 ml. of chloroform was added 15.4 g. of sulfur trioxide trimethylamine complex. Another 50 ml. of chloroform was added and the suspension was stirred vigorously for 4 hours. After standing overnight at 25° C., the chloroform was removed in vacuo to leave a white solid. The residue was dissolved in 200 ml. of water and filtered through 70 g. of Dowex 50W (H+, X4, 50–100). The column was washed with 500 ml. of water and the water was evaporated to dryness. The white residue was recrystallized from 25 ml. of water and cooled to +5° C. for several days. The white crystalline material was collected by filtering, washed with small portions of ice-cold water, and sucked dry. After finally drying in vacuo over $P_2O_5$, 9.1 g. (42 percent yield) of material was obtained identified to the title compound, M.P. 168–169° C., $\lambda_{max}^{KBr}$ 3.30, 4.10, 4.98, 5.19, 6.38, 6.91, 7.20, 9.25$\mu$.

Elemental analysis.—Calc'd for $C_5H_{11}NS_2O_3$ (percent): C, 30.44; H, 5.62; N, 7.10; S, 32.51. Found (percent): C, 30.30; H, 5.57; N, 7.27; S, 32.96.

Sodium tetrahydro-2H-thiopyran - 4 - sulfamate is prepared by neutralizing the sulfamic acid in aqueous solution with NaOH. The salt is recovered by removal of the solvent.

EXAMPLE II

Tetrahydro-2H-thiopyran-4-sulfamic acid, 1,1-dioxide

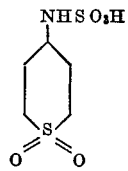

A suspension of 5.0 g. of tetrahydro-2H-thiopyran-4-sulfamic acid in 50 ml. of glacial acetic acid and 12.5 ml. of acetic anhydride was stirred and cooled to 10° C. while adding dropwise 12.5 ml. of 30 percent hydrogen peroxide. A solution formed at 10° C. and rapidly, a white product precipitated. Stirring was continued as the temperature gradually rose to 30° C. and the suspension became thicker. After stirring at 25–30° C. for four hours and standing overnight at 25° C. the white product was collected by filtration, washed wtih small portions of alcohol and finally dried in vacuo over $P_2O_5$ to obtain 4.6 g. of material identified to be the title sulfone, M.P. 207–209° C. (dec.).

$\lambda_{max.}^{KBr.}$ 7.82, 8.85μ (SO$_2$)

*Elemental analysis.*—Calc'd for C$_5$H$_{11}$NO$_5$S$_2$ (percent): C, 26.20; H, 4.83; N, 6.12; S, 28.00. Found (percent): C, 26.53; H, 4.85; N, 6.20; S, 28.01.

EXAMPLE III

N-butyltetrahydro-2H-thiopyran-4-sulfamic acid

To tetrahydro-2H-thiopyran-4-one (10.4 g.) dissolved in ice cold anhydrous methanol (400 ml.) was added anhydrous n-butylamine (40 ml.) and the solution was neutralized to pH 6 pH (paper) with a solution of hydrogen chloride in methanol. Sodium cyanoborohydride (16 g.) was added and the pH of the mixture was again adjusted to 6. The mixture was protected from moisture and stirred magnetically for half an hour. The pH was then readjusted to a value of 6 and the mixture, protected from moisture, was stirred overnight at room temperature. The mixture was diluted with water and the solution was acidified with concentrated hydrochloric acid solution. After the effervescence has ceased the solution was continuously extracted with diethyl ether. The ether layer was discarded and the aqueous layer was made strongly alkaline by addition of 50 percent sodium hydroxide solution. The aqueous solution was continuously extracted with diethyl ether and the ether layer was dried (MgSO$_4$) and evaporated to an oil. The oil was distilled under aspirator vacuum to give 12.35 g. of 4-butylaminotetrahydro-2H-thiopyran as a colorless oil, B.P. 135–145° C.

The oil was dissolved in diethyl ether (200 ml.) and dry hydrogen chloride gas was blown into the solution. The precipitated hydrochloride salt was collected and washed with several portions of diethyl ether; yield 10.41 g., M.P. 296–298° C. (dec.).

*Elemental analysis.*—Calc'd for C$_9$H$_{20}$ClNS (percent): C, 51.52; H, 9.61; Cl, 16.90; N, 6.68; S, 15.29. Found (percent): C, 51.75; H, 9.81; Cl, 17.70; N, 6.64; S, 15.38.

To N-butyltetrahydro-2H-thiopyran-4-amine (9.25 g.) in chloroform (100 ml.) was added sulfur trioxide-trimethylamine complex (7.40 g.) and the mixture, protected from moisture was stirred overnight. The solution was filtered and evaporated to a syrup. The syrup was dissolved in methanol-water (1:1) and applied to a column (3.5 x 33.5 cm.) of Dowex 50W (H$^+$, X2, 50–100) packed in 50 percent aqueous methanol. The column was eluted with methanol-water (1:1, 2 liters). The eluate was evaporated to smaller volume whereupon crystallization occurred. After refrigeration, the crude product was collected; yield 5.35 g., M.P. 124–125° C. Recrystallization from water gave the pure title compound, M.P. 122–124° C.

*Elemental analysis.*—Calc'd for C$_9$H$_{19}$NO$_3$S (percent): C, 42.66; H, 7.56; N, 5.53; S, 25.31. Found (percent): C, 42.95; H, 7.74; N, 5.70; S, 25.60.

The calcium salt is prepared by neutralization of the sulfamic acid with calcium hydroxide.

EXAMPLE IV

N-butyltetrahydro - 2H-thiopyran-4-sulfamic acid 1,1-dioxide-ethanolate

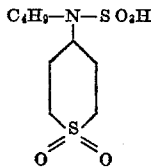

To tetrahydro-4H-thiopyran-4-one-1,1 - dioxide (14.8 g.) dissolved in ice cold anhydrous methanol (500 ml.) was added anhydrous butylamine (40 ml.) and the solution was neutralized to about pH 6 with a solution of hydrogen chloride in methanol. Sodium cyanoborohydride (16.0 g.) was added and the pH of the mixture was adjusted to a value of 6 once more. The mixture was protected from moisture and stirred magnetically for half an hour. The pH was then readjusted to 6 and the mixture, protected from moisture and stirred overnight at room temperature. The mixture was diluted with water, acidified with concentrated hydrochloric acid, and after the effervescence had ceased, the solution was continuously extracted with diethyl ether. The ether layer was discarded and the aqueous layer was made strongly alkaline by addition of 50 percent sodium hydroxide solution. The aqueous solution was continuously extracted with diethyl ether and the ether layer was dried (MgSO$_4$) and evaporated to a syrup. The syrup was co-evaporated with absolute ethanol and the residue was extracted with absolute ethanol. The extract was evaporated and the residue was extracted once more with absolute ethanol. The solvent was evaporated and the residual syrup was dissolved in diethyl ether (100 ml.). Dry hydrogen chloride was blown into the solution and more ether was added as needed. After refrigeration the precipitated salt was collected and recrystallized from methanol-diethyl ether to give 11.46 g. of 4-N-butylaminotetrahydro-2H-thiopyran, 1,1-dioxide hydrochloride, M.P. 218–219° C.

*Elemental analysis.*—Calc'd for C$_9$H$_{20}$ClNO$_2$S (percent): C, 44.71; H, 8.34; Cl, 14.66; N, 5.79; S, 13.26. Found (percent): C, 44.92; H, 8.43; Cl, 14.26; N, 5.96; S, 13.18.

4-N-butylaminotetrahydro-2H-thiopyran - 1,1 - dioxide hydrochloride (4.82 g.) was added to a stirred solution of dilute sodium hydroxide solution. The mixture was extracted twice with chloroform and the chloroform extract was washed thrice with saturated brine. The dried (MgSO$_4$) solution was evaporated to dryness and the resulting sirup was subjected to an oil pump vacuum for an hour. The yield of sirupy free amine was 4.12 g.

The above sirup was dissolved in chloroform (100 ml.) and sulfur trioxide-trimethylamine complex (2.80 g.) was added. The mixture was protected from moisture and stirred overnight at room temperature. The solution was filtered and evaporated to a sirup. The sirup was dissolved in methanol-water (1:1) and added to a column (31 x 3.5 cm.) of Dowex 50W (H$^+$, X2, 50–100) equilibrated with methanol-water (1:1). The product was eluted with 1.5 liters of methanol-water (1:1) and the solution was evaporated to a sirup. The sirup was co-evaporated with absolute ethanol and crystallized from ethanol-diethyl ether; yield of crude title compound 5.12 g., M.P. 122–125° C. Three crystallizations from the solvent gave the pure product: M.P.=146–148° C.; PMR (DMSO-d$_6$) δ 1.15 (t., (CH$_3$CH$_2$OH), 3.84 (q., CH$_3$CH$_2$OH), 8.52 (bs., NSO$_3$H).

*Elemental analysis.*—Calc'd for C$_9$H$_{19}$NO$_5$S$_2$·C$_2$H$_5$OH (percent): C, 39.86; H, 7.60; N, 4.23; S, 19.35. Found (percent): C, 39.70; H, 7.52; N, 4.76; S, 19.74.

EXAMPLE V

N-ethyltetrahydro-2H-thiopyran-4-sulfamic acid

To tetrahydro-2H-thiopyran-4-one (10.4 g.) dissolved in ice cold anhydrous methanol (30 ml.) was added anhydrous ethylamine (35 ml.) and the solution was neutralized to pH 6 (pH paper) with a solution of hydrogen chloride in methanol. Sodium cyanoborohydride (16 g.) was added the pH of the mixture was adjusted to a value of 6 once more. The mixture was protected from moisture and stirred magnetically for half an hour. The pH was then readjusted to 6 and the mixture protected from moisture, was stirred overnight at room temperature. The pH was adjusted once more and the mixture allowed to stir for a further overnight period. The mixture was diluted with water, acidified with concentrated hydrochloric acid and after the effervescence had ceased the solution was continuously extracted with diethyl ether. The ether layer was discarded and the aqueous layer was made strongly alkaline by addition of 50 percent sodium hydroxide solution.

The aqueous solution was continuously extracted with diethyl ether and the ether layer was dried (MgSO₄) and evaporated to an oil. The oil was distilled under aspirator vacuum to give 6.21 g. of 4-ethylaminotetrahydro-2H-thiopyran as a colorless oil, B.P. 105–110° C.

The oil was dissolved in ether (100 ml.) and dry hydrogen chloride gas was blown into the solution. The precipitated hydrochloride salt was collected and washed with several portions of diethyl ether; yield 6.30 g., M.P. 211–214° C., PMR (D₂O) δ 1.25 (C$\underline{\text{H}}$₃CH₂—).

*Elemental analysis.*—Calc'd for C₇H₁₄ClNS (percent): C, 46.25; H, 8.87; Cl, 19.52; N, 7.71; S, 17.64. Found (percent): C, 46.60; H, 9.16; Cl, 19.69; N, 7.80; S, 17.87.

Following the procedure of Example 3, 4-N-ethylaminotetrahydro-2H-thiopyran is reacted overnight with sulfur trioxide-trimethylamine complex in chloroform. The product is purified with Dowex 50 and recovered after concentration of the eluate to yield N-ethyltetrahydro-2H-thiopyran-4-sulfamic acid.

EXAMPLE VI

N-ethyltetrahydro-2H-thiopyran-4-sulfamic acid 1,1-dioxide

To tetrahydro-4$\underline{\text{H}}$-thiopyran-4-one 1,1-dioxide (14.8 g.) dissolved in ice cold anhydrous methanol (500 ml.) was added anhydrous ethylamine (35 ml.) and the solution was neutralized to 6 (pH paper) with a solution of hydrogen chloride in methanol. Sodium cyanoborohydride (16.0 g.) was added and the pH of the mixture was adjusted to a value of 6 once more. The mixture was protected from moisture and stirred magnetically for half an hour. The pH was then readjusted to 6 and the mixture, protected from moisture was stirred for 2 days at room temperature. The mixture was diluted with water, acidified with concentrated hydrochloric acid and after the effervescence had ceased the solution was continuously extracted with diethyl ether. The ether layer was discarded and the aqueous layer was made strongly alkaline by addition of 50 percent sodium hydroxide solution. The aqueous solution was continuously extracted with diethyl ether and the ether layer was dried (MgSO₄) and evaporated to a sirup. The sirup was dissolved in chloroform (20 ml.) and diethyl ether (100 ml.) and dry hydrogen chloride was blown into the solution. The mixture, protected from moisture, was stirred overnight. The resulting solid was collected and recrystallized from methanol-diethyl ether to give 4.26 g. of crude title product; M.P. 214–216° C. A further recrystallization from methanol-diethyl ether gave 4-N-ethylaminotetrahydro-2H-thiopyran 1,1-dioxide hydrochloride as a pure product, M.P. 214–216° C., PMR (DMSO-d₆) δ 1.26 (t., C$\underline{\text{H}}$₃CH₂).

*Elemental analysis.*—Calc'd for C₇H₁₆NO₂SCl (percent): C, 39.34; H, 7.55; Cl, 16.59; N, 6.55; S, 15.00. Found (percent): C, 39.39; H, 7.68; Cl, 16.54; N, 6.59; S, 14.73.

Following the procedure of Example 4, 4-N-ethylaminotetrahydro-2H-thiopyran, 1,1-dioxide is reacted overnight with sulfur trioxide-trimethylamine complex in chloroform. The product is purified with Dowex 50 and recovered after concentration of the eluate to yield N-ethyltetrahydro-2H-thiopyran-4-sulfamic acid, 1,1-dioxide.

EXAMPLE VIII

N-(2-hydroxyethyl)tetrahydro-2H-thiopyran-4-sulfamic acid

To tetrahydro-2$\underline{\text{H}}$-thiopyran-4-one (20.8 g.) dissolved in ice cold anhydrous methanol (600 ml.) was added ethanolamine (60 ml.) and the solution was neutralized to pH 6 (pH paper) with a solution of hydrogen chloride in methanol. Sodium cyanoborohydride (32 g.) was added and the pH of the mixture was adjusted to a value of 6 once more. The mixture was protected from moisture and stirred magnetically for half an hour. The pH was then readjusted to 6 and the mixture, protected from moisture, was stirred for 5 days at room temperature. The mixture was diluted with water, acidified with concentrated hydrochloric acid and after the effervescence had ceased the solution was continuously extracted with diethyl ether. The ether layer was discarded and the aqueous layer was made strongly alkaline by addition of 50 percent sodium hydroxide solution. The aqueous solution was continuously extracted with diethyl ether and the ether layer was dried (MgSO₄) and evaporated to an oil. The oil was distilled under oil pump vacuum to give a product (B.P. 110–120° C. at 0.1 mm. Hg) which crystallized spontaneously. Recrystallization from diethyl ether-heptane gave 13.80 g. of 2-(tetrahydro-2H-thiopyran-4-ylamino) ethanol, M.P. 53.56° C.

2-(tetrahydro-2$\underline{\text{H}}$-thiopyran-4-ylamino) ethanol (1.50 g.) was dissolved in chloroform (25 ml.). Dry hydrogen chloride was blown into the solution. Anhydrous ether was added and dry hydrogen chloride was blown into the solution once more. The resulting gum was triturated with ether to give a solid. The solid was crystallized from the same solvent gave pure material, M.P. 133–136° C.

*Elemental analysis.*—Calc'd for C₇H₁₆ClNOS (percent): C, 42.52; H, 8.16; N, 7.08; Cl, 17.93; S, 16.17. Found (percent): C, 42.90; H, 8.30; N, 7.14; Cl, 17.77; S, 15.98.

Following the procedure of Example 3, 2-(tetrahydro-2H-thiopyran-4-ylamino) ethanol is reacted overnight with sulfur trioxide-trimethylamine complex in chloroform. The product is purified with Dowex 50 and recovered after concentration of the eluate to yield N-(2-hydroxyethyl)tetrahydro-2H-thiopyran-4-sulfamic acid.

What is claimed is:

1. A compound selected from the formula:

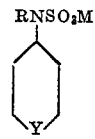

in which

R is a member selected from the group consisting of —H, lower alkyl and hydroxy(lower)alkyl radicals;

M is a member selected from the group consisting of —H, an alkali metal and an alkaline earth metal; and Y is a member selected from the group consisting of

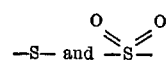

2. A compound of claim 1 which is tetrahydro-2H-thiopyran-4-sulfamic acid.

3. A compound of claim 1 which is tetrahydro-2H-thiopyran-4-sulfamic acid, 1,1-dioxide.

4. A compound of claim 1 which is N-butyltetrahydro-2H-thiopyran-4-sulfamic acid.

5. A compound of claim 1 which is N-butyltetrahydro-2H-thiopyran-4-sulfamic acid, 1,1-dioxide.

6. A compound of claim 1 which is N-ethyltetrahydro-2H-thiopyran-4-sulfamic acid.

7. A compound of claim 1 which is N-ethyltetrahydro-2H-thiopyran-4-sulfamic acid 1,1-dioxide.

8. A compound of claim 1 which is N-(2-hydroxyethyl)tetrahydro-2H-thiopyran-4-sulfamic acid.

References Cited

Barkenbus et al.: J.A.C.S., 77:3866 (1955).

HENRY R. JILES, Primary Examiner

C. M. S. JAISLE, Assistant Examiner

U.S. Cl. X.R.

99—140 R